US008300006B2

(12) United States Patent
Zhou et al.

(10) Patent No.: US 8,300,006 B2
(45) Date of Patent: Oct. 30, 2012

(54) ELECTROPHORETIC DISPLAY UNIT

(75) Inventors: Guofu Zhou, Eindhoven (NL); Masaru Yasui, Kobe (JP); Mark Thomas Johnson, Eindhoven (NL); Robert Waverly Zehner, Arlington, MA (US); Karl Raymond Amundson, Cambridge, MA (US)

(73) Assignee: E Ink Corporation, Cambridge, MA (US)

( * ) Notice: Subject to any disclaimer, the term of this patent is extended or adjusted under 35 U.S.C. 154(b) by 1038 days.

(21) Appl. No.: 10/574,146

(22) PCT Filed: Sep. 27, 2004

(86) PCT No.: PCT/IB2004/051863

§ 371 (c)(1),
(2), (4) Date: Mar. 29, 2006

(87) PCT Pub. No.: WO2005/034074

PCT Pub. Date: Apr. 14, 2005

(65) Prior Publication Data

US 2007/0013683 A1 Jan. 18, 2007

Related U.S. Application Data

(60) Provisional application No. 60/508,717, filed on Oct. 3, 2003.

(51) Int. Cl.

| | |
|---|---|
| ***G09G 3/34*** | (2006.01) |
| ***G09G 3/36*** | (2006.01) |
| ***G09G 5/00*** | (2006.01) |
| ***G06F 3/038*** | (2006.01) |
| ***G02B 26/00*** | (2006.01) |

(52) U.S. Cl. .......... 345/107; 345/208; 345/209; 345/94; 345/96; 359/296

(58) Field of Classification Search .................. 345/208, 345/209, 94, 96, 107; 349/86, 89; 359/267, 359/296

See application file for complete search history.

(56) References Cited

U.S. PATENT DOCUMENTS

| | | | | |
|---|---|---|---|---|
| 6,522,315 | B2 * | 2/2003 | Ozawa et al. | 345/92 |
| 6,628,258 | B1 * | 9/2003 | Nakamura | 345/98 |
| 7,012,600 | B2 | 3/2006 | Zehner et al. | |
| 2002/0005832 | A1 | 1/2002 | Katase | |
| 2002/0021483 | A1 * | 2/2002 | Katase | 359/267 |
| 2003/0102858 | A1 * | 6/2003 | Jacobson et al. | 324/158.1 |
| 2006/0007194 | A1 * | 1/2006 | Verschueren et al. | 345/204 |
| 2007/0008278 | A1 * | 1/2007 | Johnson et al. | 345/107 |

FOREIGN PATENT DOCUMENTS

| | | | |
|---|---|---|---|
| WO | 9953373 | A1 | 10/1999 |
| WO | 03079323 | A1 | 9/2003 |

* cited by examiner

*Primary Examiner* — Bipin Shalwala
*Assistant Examiner* — Ilana Spar
(74) *Attorney, Agent, or Firm* — David J. Cole

(57) ABSTRACT

Electrophoretic display units (1) comprising pixels (11) situated between common electrodes (6) and pixel electrodes (5) need, for shortening the total image update times, increased driving voltages across the pixels (11) which endanger transistors (12) coupled to the pixel electrodes (5). These increased driving voltage ($V_6$) to the common electrode (6). To protect the transistors (12) against these increased driving voltages, a setting signal ($S_1$, $S_2$) is supplied to the pixel electrode (5) via the transistor (12) for reducing a voltage across the pixel (11) resulting from a transition in the alternating voltage signal ($V_6$). During driving frame periods ($F_d$) data pulses ($D_1$, $D_2$, $D_3$, $D_4$, $D_5$, $D_6$) are supplied, and during setting frame periods ($F_s$), the setting signals ($S_1$, $S_2$) are supplied.

9 Claims, 3 Drawing Sheets

ELECTROPHORETIC DISPLAY UNIT

This application is the U.S. National Phase of International application PCT/IB04/51863, filed Sep. 27, 2004, which claims benefit of U.S. provisional application 60/508,717, filed on Oct. 3, 2003.

The invention relates to an electrophoretic display unit, to a display device, and to a method for driving an electrophoretic display unit.

Examples of display devices of this type are: monitors, laptop computers, personal digital assistants (PDAs), mobile telephones and electronic books, electronic newspapers, and electronic magazines.

A prior art electrophoretic display unit is known from WO 99/53373 which discloses an electronic ink display comprising two substrates, one of the substrates being transparent and having a common electrode (also known as counter electrode); and the other substrate being provided with pixel electrodes arranged in rows and columns. A crossing between a row and a column electrode is associated with a pixel. The pixel is formed between a part of the common electrode and a pixel electrode. The pixel electrode is coupled to a drain of a transistor, of which a source is coupled to a column electrode or data electrode, and of which a gate is coupled to a row electrode or selection electrode. This arrangement of pixels, transistors and row and column electrodes jointly forms an active matrix. A row driver (select driver) supplies a row driving signal or a selection signal for selecting a row of pixels, and the column driver (data driver) supplies column driving signals or data signals to the selected row of pixels via the column electrodes and the transistors. The data signals correspond to data to be displayed, and form, together with the selection signal, a (part of a) driving signal for driving one or more pixels.

Furthermore, an electronic ink is provided between the pixel electrode and the common electrode provided on the transparent substrate. The electronic ink comprises multiple microcapsules with a diameter of about 10 to 50 microns. Each microcapsule comprises positively charged white particles and negatively charged black particles suspended in a fluid. When a positive voltage is applied to the pixel electrode, the white particles move to the side of the microcapsule directed to the transparent substrate, and the pixel becomes visible to a viewer. Simultaneously, the black particles move to the pixel electrode at the opposite side of the microcapsule where they are hidden from the viewer. By applying a negative voltage to the pixel electrode, the black particles move to the common electrode at the side of the microcapsule directed to the transparent substrate, and the pixel appears dark to a viewer. Simultaneously, the white particles move to the pixel electrode at the opposite side of the microcapsule where they are hidden from the viewer. When the electric voltages are removed, the display unit remains in the acquired state and exhibits a bi-stable character.

To reduce the dependency of the optical response of the electrophoretic display unit on the history of the pixels, preset data signals are supplied before the data-dependent signals are supplied. These preset data signals comprise data pulses representing energies which are sufficient to release the electrophoretic particles from a static state at one of the two electrodes, but which are too low to allow the electrophoretic particles to reach the other one of the electrodes. Because of the reduced dependency on the history of the pixels, the optical response to identical data will be substantially equal, regardless of the history of the pixels.

The time-interval required for driving all pixels in all rows once (by driving each row one after the other and by driving all columns simultaneously once per row) is called a frame. Per frame, each data pulse for driving a pixel requires, per row, a row driving action for supplying the row driving signal (the selection signal) to the row for selecting (driving) this row, and a column driving action for supplying the data pulse, like for example a data pulse of the preset data signals or a data pulse of the data-dependent signals, to the pixel. Usually, the latter is done for all pixels in a row simultaneously.

When updating an image, firstly a number of data pulses of the preset data signals are supplied, further to be called preset data pulses. Each preset data pulse has a duration of one frame period. The first preset data pulse, for example, has a positive amplitude, the second one a negative amplitude, and the third one a positive amplitude etc. Such preset data pulses with alternating amplitudes do not change the gray value displayed by the pixel.

During one or more subsequent frames, the data-dependent signals are supplied, with a data-dependent signal having a duration of zero, one, two to for example fifteen frame periods. Thereby, a data-dependent signal having a duration of zero frame periods, for example, corresponds with the pixel displaying full black assuming that the pixel already displayed full black. In case the pixel displayed a certain gray value, this gray value remains unchanged when the pixel is driven with a data-dependent signal having a duration of zero frame periods, in other words when being driven with a driving data pulse having a zero amplitude. A data-dependent signal having, for example, a duration of fifteen frame periods comprises fifteen driving data pulses and results in the pixel displaying full white, and a data-dependent signal having a duration of one to fourteen frame periods, for example, comprises one to fourteen driving data pulses and results in the pixel displaying one of a limited number of gray values between full black and full white.

Each one of these pulses has a width and a height. The product of width and height represents the energy of this pulse. Due to a certain energy being necessary for a certain driving action, per certain driving action, the required energy must be equal to or exceed a minimum value.

To get shorter image update times for updating images to be displayed by an electrophoretic display unit, or in other words, to increase the driving speed of an electrophoretic display unit, the width of one or more pulses is to be minimized. To get the required energy per pulse, the height of these pulses is then to be increased, in other words the voltage amplitudes of these pulses for driving the pixels are then to be increased.

According to a first option, to increase the height of the pulses across the pixels, the standard data driver is to be adapted or is to be replaced by another data driver. Due to the common electrode being coupled to ground, an adapted or another data driver must be able to supply pulses having a larger height. Such an adapted or another data driver is however to be avoided, as it may be significantly more expensive. According to a second option, when using the same standard data driver, the height of the pulses across the pixels is increased by supplying a non-zero, alternating voltage signal to the common electrode. Thereto, when driving the pixels with positive data pulses, the common electrode should be at a negative voltage level, and when driving the pixels with negative data pulses, the common electrode should be at a positive voltage level. As a result, larger voltage amplitudes will be present across the pixels.

The known electrophoretic display unit is disadvantageous, inter alia, due to the electrical characteristics of the transistors of the active matrix display being degraded by these larger voltages amplitudes. After prolonged operation, the transistors may even become non active, or broken. Most of the time of a frame, the gate of a transistor is at zero Volt, where the drain coupled to the pixel electrode will be at a positive or negative voltage. Due to an electrical equivalence of a pixel comprising a capacitance, voltage transitions, (i.e. edges) in the alternating voltage signal of a pixel common electrode are added to this positive or negative voltage, resulting in a relatively large voltage swing across the transistor.

Another disadvantage of the known electrophoretic display unit is that, when the voltage across the pixel is negative with respect to the voltage of the common electrode, and this common voltage is brought to a lower level, the pixel voltage will be brought even further negative. At this point, it is likely that the pixel voltage is lower than the transistor gate voltage. This situation is not stable: if the drain voltage is lower than the gate voltage, the transistor will be turned on and the pixel electrode will increase in voltage until it is roughly at the same level as the gate voltage. As a result, the ink will not be driven with the required negative voltage, and the applied pixel energy will be substantially less than expected.

It is an object of the invention to provide an electrophoretic display unit which can be driven with larger voltage amplitudes across the pixels without the switching elements (for example, transistors etc.) becoming seriously degraded or broken.

The electrophoretic display unit according to the invention comprises an electrophoretic display panel comprising a pixel coupled to a pixel electrode;

data driving circuitry for supplying a data pulse to the pixel electrode via a switching element;

a common electrode coupled to the pixel for receiving an alternating voltage signal; and a controller for controlling the data driving circuitry for supplying a setting signal to the pixel electrode for reducing a voltage across the pixel before a transition of the alternating voltage signal.

By supplying the setting signal to the pixel electrode, the pixel electrode is set to a predefined voltage. For example, in case of a positive transition in the alternating voltage signal, the voltage across the pixel (11) is reduced by setting the pixel electrode to a lower voltage or a negative voltage before the positive transition. In case of a negative transition in the alternating voltage signal, the pixel electrode is to be set to a higher voltage or a positive voltage, before the negative transition. So, the transitions in the alternating voltage signal are at least partly anticipated, and the total voltage swing across the switching element is reduced. The switching element can now provide larger voltage amplitudes across the pixel without having to handle voltages exceeding its ratings, thereby avoiding serious degradation of its electrical characteristics.

An embodiment of an electrophoretic display unit according to the invention is defined by further comprising selection driving circuitry. A selection pulse is supplied to the switching element for bringing the switching element in a conducting state during the selection pulse, and as a result the setting signal supplied to the switching element becomes a setting pulse supplied to the pixel electrode.

An embodiment of an electrophoretic display unit according to the invention is defined by the switching element comprising a transistor, having a gate, source and drain, the data driving circuitry being coupled to the source via a data electrode, the selection driving circuitry being coupled to the gate via a selection electrode, and the pixel electrode being coupled to the drain. Such a transistor is a low cost solution, especially if it comprises amorphous silicon or organic semiconductors. Due to the gate being coupled to ground, or a low voltage close to zero Volt during absence of the selection pulse, most of the time of a frame this gate-drain voltage difference is equal to the voltage at the pixel electrode with respect to ground (or the low voltage).

An embodiment of an electrophoretic display unit according to the invention is defined by the data pulse being supplied during a driving frame period and the setting signal being supplied during a setting frame period, the alternating voltage signal having the transition after the setting frame period. Compared to prior art solutions just comprising driving frames period, in addition, setting frames are introduced, to be able to supply the setting signal.

In an embodiment the data pulse is supplied during more than one consecutive driving frame period. In this way, the increase of the image update time can be lowered further.

An embodiment of an electrophoretic display unit according to the invention is defined by the setting frame period being shorter than the driving frame period. The introduction of the setting frame periods reduces the driving speed of the electrophoretic display unit, and increases the image update times for updating images to be displayed by the electrophoretic display unit. However, by making the setting frame period shorter than the driving frame period, the increase of the image update time can be reduced. An embodiment of an electrophoretic display unit according to the invention is defined by the alternating voltage signal and the setting signal having equal polarities during a setting frame period. Then the transitions in the alternating voltage signal are anticipated in such a way, that the total voltage swing across the switching element is reduced.

In an embodiment an amplitude of alternating voltage signal and an amplitude of the setting signal are substantially equal to each other during a setting frame period. This embodiment substantially minimizes the resulting voltage swing across the switching element.

An embodiment of an electrophoretic display unit according to the invention is defined by the controller being adapted to control the data driving circuitry to provide shaking data pulses, one or more reset data pulses, and one or more driving data pulses to the pixel. The shaking data pulses for example correspond with the preset data pulses discussed before. The reset data pulses precede the driving data pulses to further improve the optical response of the electrophoretic display unit, by defining a fixed starting point (an extreme optical state, for example fixed black or fixed white) for the driving data pulse. Alternatively, the reset data pulses precede the driving data pulses to further improve the optical response of the electrophoretic display unit, by defining a flexible starting point (an extreme optical state, for example black or white, to be selected in dependence of and closest to the gray value to be defined by the following driving data pulses) for the driving data pulses.

Instead of using the larger voltage amplitudes for shortening the shaking pulses and/or the reset pulses (while keeping their energies unchanged), alternatively the larger voltage amplitudes may be used without shortening the shaking pulses and/or the reset pulses to increase their energies and to thereby increase the quality of the shaking and/or the resetting.

The display device as claimed in claim 9 may be an electronic book, while the storage medium for storing information may be a memory stick, an integrated circuit, a memory like an optical or magnetic disc or other storage device for storing, for example, the content of a book to be displayed on the display unit.

Embodiments of a method according to the invention and of a processor program product according to the invention correspond with the embodiments of an electrophoretic display unit according to the invention.

The invention is based upon an insight, inter alia, that a shorter total image update time corresponding to an increased driving speed, needs larger driving voltages across the pixels which endanger the switching elements, and is based upon a basic idea, inter alia, that a voltage swing across the switching element resulting from a transition in the alternating voltage signal on a common pixel electrode can be reduced by setting the pixel electrode to a setting voltage before the transition.

The invention solves the problem, inter alia, of providing an electrophoretic display unit which can be driven with larger voltages amplitudes across the pixels without the switching elements (like for example transistors etc.) becoming seriously degraded or broken, and is advantageous, inter alia, in that the electrophoretic display unit either can have a shorter total image update time, so an increased driving speed, for displaying images with the same image quality, or can display images with an improved image quality at the same total image update time. This invention also solves the problem of back-conduction through the transistor, when the pixel electrode becomes more negative than the gate off voltage of the transistor.

These and other aspects of the invention will be apparent from and elucidated with reference to the embodiments(s) described hereinafter.

Figure 1:
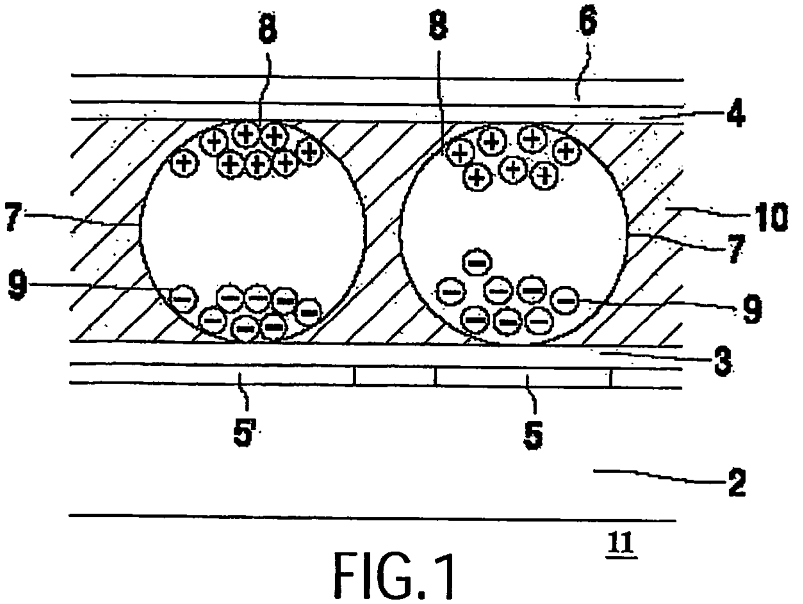
FIG. 1 shows (in cross-section) a pixel.

The pixel 11 of the electrophoretic display unit shown in FIG. 1 (in cross-section) comprises a base substrate 2, an electrophoretic film (laminated on base substrate 2) with an electronic ink, which is present between two transparent substrates 3,4 of, for example, polyethylene. One of the substrates 3 is provided with transparent pixel electrodes 5 and the other substrate 4 is provided with a transparent common electrode 6. The electronic ink comprises multiple microcapsules 7 of about 10 to 50 microns in diameter. Each microcapsule 7 comprises positively charged white particles 8 and negatively charged black particles 9 suspended in a fluid 10. When a positive voltage is applied to the pixel electrode 5, the white particles 8 move to the side of the microcapsule 7 directed to the common electrode 6, and the pixel becomes visible to a viewer. Simultaneously, the black particles 9 move to the opposite side of the microcapsule 7 where they are hidden from the viewer. By applying a negative voltage to the pixel electrode 5, the black particles 9 move to the side of the microcapsule 7 directed to the common electrode 6, and the pixel appears dark to a viewer (not shown). When the electric voltage is removed, the particles 8,9 remain in the acquired state and the display exhibits a bi-stable character and consumes substantially no power. In alternative systems, particles may move in an in-plane direction, driven by electrodes, which may be situated on the same substrate.

Figure 2:
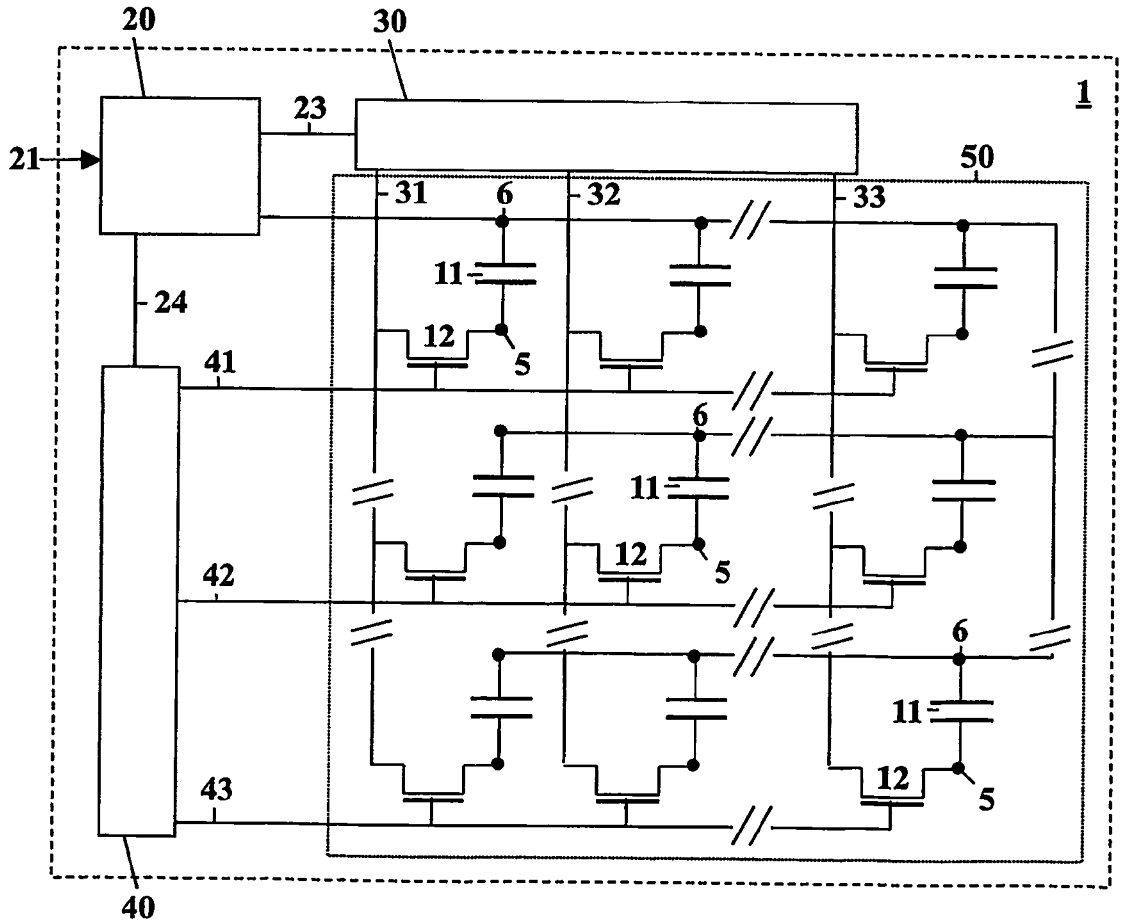
FIG. 2 shows diagrammatically an electrophoretic display unit.

The electrophoretic display unit 1 shown in FIG. 2 comprises a display panel 60 comprising a matrix of pixels 11 at the area of crossings of row or selection electrodes 41,42,43 and column or data electrodes 31,32,33. These pixels 11 are all coupled to a common electrode 6, and each pixel 11 is coupled to its own pixel electrode 5. The electrophoretic display unit 1 further comprises selection driving circuitry 40 (row driver 40) coupled to the row electrodes 41,42,43 and data driving circuitry 30 (column driver 30) coupled to the column electrodes 31,32,33 and comprises per pixel 11 an active switching element 12. The electrophoretic display unit 1 is driven by these active switching elements 12 (in this example (thin-film) transistors). The selection driving circuitry 40 consecutively selects the row electrodes 41,42,43, while the data driving circuitry 30 provides data signals to the column electrode 31,32,33. Preferably, a controller 20 first processes incoming data arriving via input 21 and then generates the data signals. Mutual synchronisation between the data driving circuitry 30 and the selection driving circuitry 40 takes place via drive lines 23 and 24. Selection signals from the selection driving circuitry 40 select the pixel electrodes 5 via the transistors 12 of which the drain electrodes are electrically coupled to the pixel electrodes 5 and of which the gate electrodes are electrically coupled to the row electrodes 41,42,43 and of which the source electrodes are electrically coupled to the column electrodes 31,32,33. A data signal present at the column electrode 31,32,33 is simultaneously transferred to the pixel electrode 5 of the pixel 11 coupled to the drain electrode of the transistor 12. Instead of transistors, other switching elements can be used, such as diodes, MIMs, etc. The data signals and the selection signals together form (parts of) driving signals.

The processor 20, together with the data driving circuitry 30 and, optionally, the selection driving circuitry 40, form a driving circuit 20, 30. This driving unit 20, 30 may be formed by one or more integrated circuits, which may be combined with other components as an electronic unit.

Incoming data, such as image information receivable via input 21 is processed by controller 20. Thereto, controller 20 detects an arrival of new image information about a new image and in response starts the processing of the image information received. This processing of image information may comprise the loading of the new image information, the comparing of previous images stored in a memory of controller 20 and the new image, the interaction with temperature sensors, the accessing of memories containing look-up tables of drive waveforms etc. Finally, controller 20 detects when this processing of the image information is ready.

Then, controller 20 generates the data signals to be supplied to data driving circuitry 30 via drive lines 23 and generates the selection signals to be supplied to row driver 40 via drive lines 24. These data signals comprise data-independent signals which are the same for all pixels 11 and data-dependent signals which may or may not vary per pixel 11. The data-independent signals comprise shaking data pulses forming the preset data pulses, with the data-dependent signals comprising one or more reset data pulses and one or more driving data pulses. These shaking data pulses comprise pulses representing energy which is sufficient to release the electrophoretic particles 8,9 from a static state at one of the two electrodes 5,6, but which is too low to allow the particles 8,9 to reach the other one of the electrodes 5,6. Because of the reduced dependency on the history, the optical response to identical data will be substantially equal, regardless of the history of the pixels 11. So, the shaking data pulses reduce the dependency of the optical response of the electrophoretic display unit on the history of the pixels 11. The reset data pulse precedes the driving data pulse to further improve the optical response, by defining a flexible starting point for the driving data pulse. This starting point may be a black or white level, to be selected in dependence on and closest to the gray value defined by the following driving data pulse. Alternatively, the reset data pulse may form part of the data-independent signals and may precede the driving data pulse to further improve the optical response of the electrophoretic display unit, by defining a fixed starting point for the driving data pulse. This starting point may be a fixed black or fixed white level.

Figure 3:
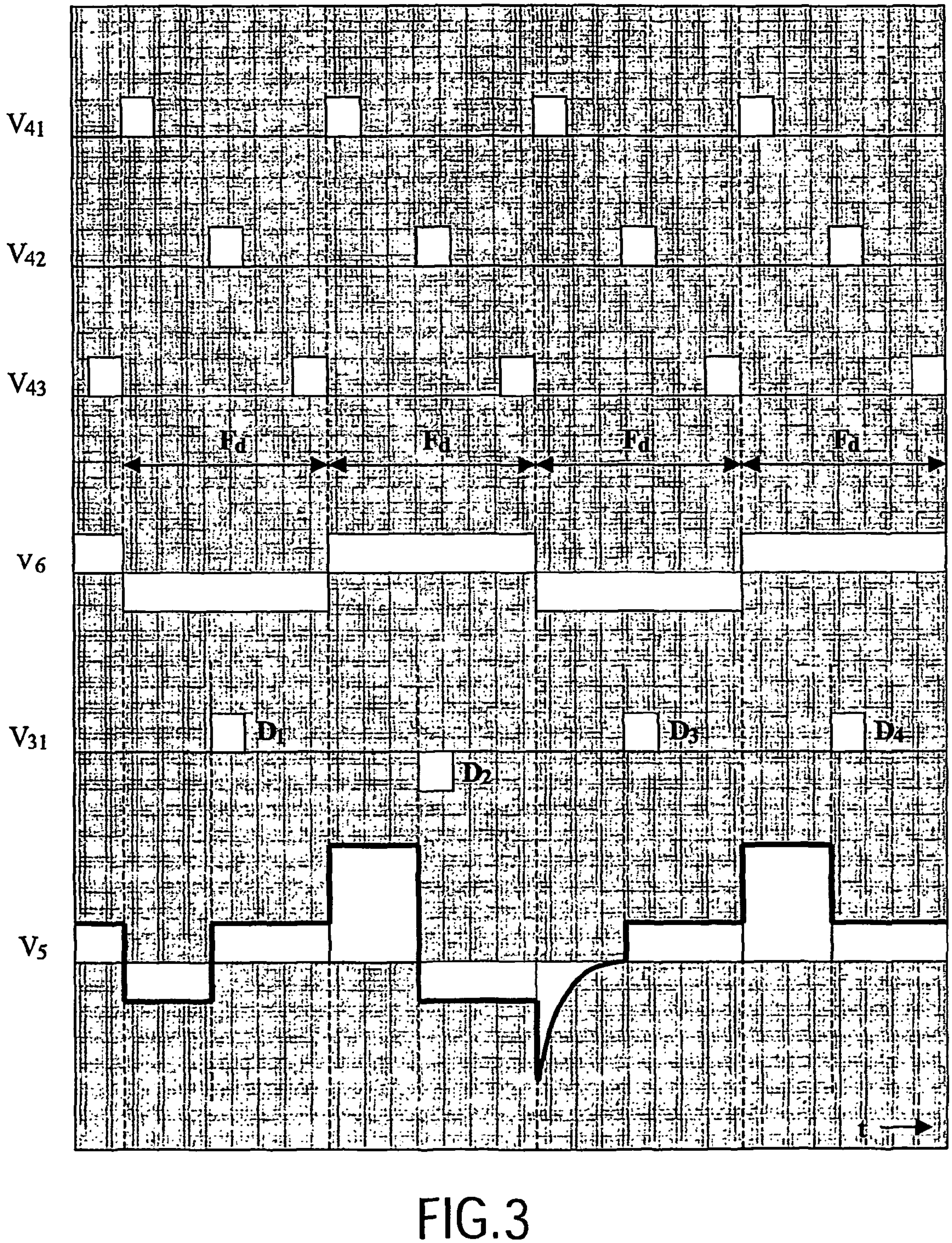
FIG. 3 shows prior art voltages in an electrophoretic display unit.

The prior art voltages shown in FIG. 3 comprise selection pulses $V_{41}$, $V_{42}$, $V_{43}$ as present at row electrodes 41,42,43, an alternating voltage signal $V_6$ as present at common electrode 6, data pulses $D_1$, $D_2$, $D_3$, $D_4$ as present at column electrode 31, and the voltage $V_5$ at pixel electrode 5, for four driving frames $F_d$. The voltage $V_5$ has, before the start of the first frame $F_d$, an amplitude of for example +15 Volt, due to a previous data pulse for example being positive and having a positive amplitude of for example +15 Volt. Then, at the start of the first frame $F_d$, the negative transition in the alternating voltage signal $V_6$ from for example +15 Volt to −15 Volt is coupled to the voltage $V_5$ due to an electrical equivalence of a pixel 11 comprising a capacitance. The voltage $V_5$ becomes −15 Volt. During a first selection pulse $V_{42}$ as present at row electrodes 42, the first data pulse $D_1$ is supplied via transistor 12 to pixel electrode 5 in a row corresponding with row electrode 42 and in a column corresponding with data electrode 31. As a result the voltage $V_5$ becomes +15 Volt. At the start of the second frame $F_d$, the positive transition in the alternating voltage signal $V_6$ from for example −15 Volt to +15 Volt is coupled to the voltage $V_5$. The voltage $V_5$ becomes +45 Volt. During a second selection pulse $V_{42}$ as present at row electrode 42, the second data pulse $D_2$ is supplied via transistor 12 to pixel electrode 5. As a result, the voltage $V_5$ becomes −15 Volt. At the start of the third frame $F_d$, the negative edge in the alternating voltage signal $V_6$ from for example +15 Volt to −15 Volt is coupled to the voltage $V_5$. The voltage $V_5$ becomes −45 Volt. At this point in time the gate voltage of the transistor 12 is at a level of the voltage at the row electrode, being about 0 Volt. As a result the transistor 12 starts conducting and discharges the capacitance of the pixel 11 until the voltage $V_5$ reaches this level of zero Volts. During a third selection pulse $V_{42}$ as present at row electrode 42, the third data pulse $D_3$ is supplied via transistor 12 to pixel electrode 5. As a result, the voltage $V_5$ becomes +15 Volt. At the start of the fourth frame $F_d$, the positive edge in the alternating voltage signal $V_6$ from for example −15 Volt to +15 Volt is coupled to the voltage $V_5$. The voltage $V_5$ becomes +45 Volt. During a fourth selection pulse $V_{42}$ as present at row electrode 42, the fourth data pulse $D_4$ is supplied via transistor 12 to pixel electrode 5. As a result, the voltage $V_5$ becomes +15 Volt etc. As the pixel voltage is defined by the difference between $V_5$ and $V_6$, the pixel voltage ranges between +30 Volt and −30 Volt.

Clearly, the total voltage swing in the voltage $V_5$ is about 90 Volt. As the gate of transistor 12 is coupled to ground, so is at zero Volt most of the frame time, this total voltage swing is also present across the drain-gate-junction of transistor 12, and may cause a breakdown of a transistor 12. More precisely, the voltage difference present across the drain-gate-junction of transistor 12 corresponds with the $V_5$ minus $V_{42}$. As can be derived from FIG. 3, this voltage difference still has the voltage swing of about 90 Volt. In addition, large voltages across the source and drain of the transistor may cause further degradation. Further, large voltage amplitudes during a short time will reduce the risk of breakdown of a transistor. The duration of a selection pulse $V_{42}$ is, for example, about 1/1000 of the duration of a frame $F_d$, so during this short period there is much less risk that the transistor 12 breaks down.

Figure 4:
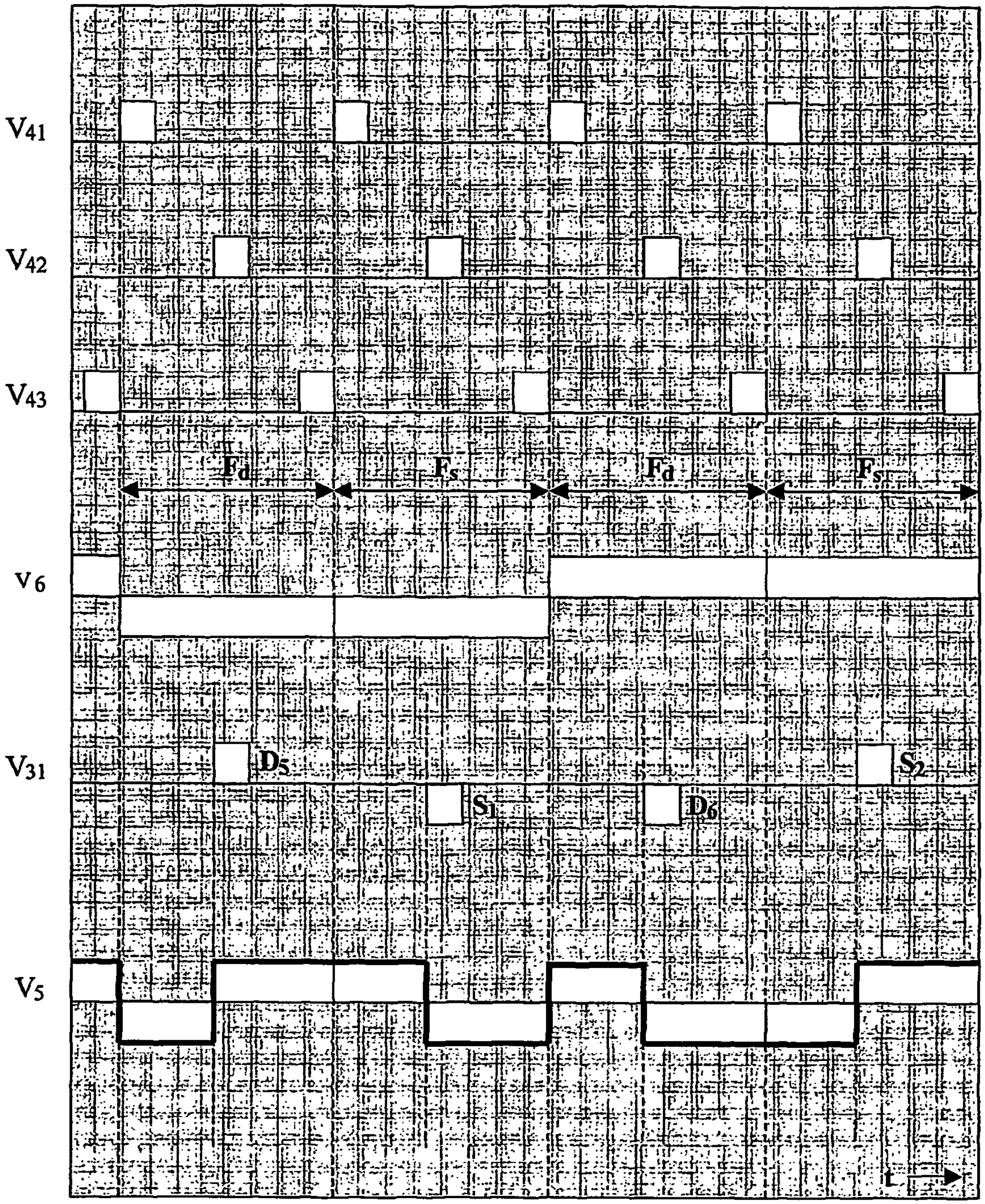
FIG. 4 shows voltages according to the invention in an electrophoretic display unit.

The voltages according to the invention shown in FIG. 4 comprise selection pulses $V_{41}$, $V_{42}$, $V_{43}$ as present at row electrodes 41,42,43, an alternating voltage signal $V_6$ as present at common electrode 6, a first data pulse $D_5$, a first setting signal $S_1$, a second data pulse $D_6$, and a second setting signal $S_2$ as present at column electrode 31, and the voltage $V_5$ at pixel electrode 5, for a first driving frame $F_d$, a first setting frame $F_s$, a second driving frame $F_d$, and a second setting frame $F_s$. The voltage $V_5$ has, before the start of the first driving frame $F_d$, an amplitude of for example +15 Volt, due to a previous setting signal for example being positive and having a positive amplitude of for example +15 Volt. Then, at the start of the first driving frame $F_d$, the negative edge in the alternating voltage signal $V_6$ from for example +15 Volt to −15 Volt is coupled to the voltage $V_5$ due to an electrical equivalence of a pixel 11 comprising a capacitance. The voltage $V_5$ becomes −15 Volt. During a first selection pulse $V_{42}$ as present at row electrode 42, the first data pulse $D_5$ is supplied via transistor 12 to pixel electrode 5 in a row corresponding with row electrode 42 and in a column corresponding with data electrode 31. As a result, the voltage $V_5$ becomes +15 Volt. At the start of the first setting frame $F_s$, there is no transition in the alternating voltage signal $V_6$ and the voltage $V_5$ remains +15 Volt. During a second selection pulse $V_{42}$ as present at row electrode 42, the first setting signal $S_1$ is supplied via transistor 12 to pixel electrode 5. As a result, the voltage $V_5$ becomes −15 Volt. At the start of the second driving frame $F_d$, the positive edge in the alternating voltage signal $V_6$ from for example −15 Volt to +15 Volt is coupled to the voltage $V_5$. The voltage $V_5$ becomes +15 Volt. During a third selection pulse $V_{42}$ as present at row electrode 42, the second data pulse $D_6$ is supplied via transistor 12 to pixel electrode 5. As a result, the voltage $V_5$ becomes −15 Volt. At the start of the second setting frame $F_s$, there is no transition in the alternating voltage signal $V_6$ and the voltage $V_5$ remains −15 Volt. During a fourth selection pulse $V_{42}$ as present at row electrode 42, the second setting signal $S_2$ is supplied via transistor 12 to pixel electrode 5. As a result, the voltage $V_5$ becomes +15 Volt etc. Again, the pixel takes values of +30 Volt and −30 Volt, with also time intervals where the voltage across the pixel is zero Volt.

Clearly, the total voltage swing in the voltage $V_5$ is about 30 Volt. As the gate of transistor 12 is coupled to ground, so is at zero Volt most of the frame time, this total voltage swing is also present across the drain-gate-junction of transistor 12, and does not endanger transistor 12. More precisely, the voltage difference present across the drain-gate-junction of transistor 12 corresponds with the $V_5$ minus $V_{42}$. As can be derived from FIG. 4, this voltage difference may become 30 Volt, but only during a very short time when the pixel is being selected, and this does not endanger the transistor 12 as much as the prior art voltage swing of about 90 Volt. As described before, the duration of a selection pulse $V_{42}$ is, for example, about 1/1000 of the duration of a frame period $F_d$.

It should be noted that FIG. 4 just shows the voltages for a pixel 11 in a row corresponding with row electrode 42 and in a column corresponding with data electrode 31. The setting signal $S_1$,$S_2$ at data electrode 31 is supplied to the source of the transistor 12 and becomes, at the drain of the transistor 12, a setting pulse $S_1$,$S_2$, due to the transistor 12 being brought in a conductive state in response to and only during the supply of a selection pulse. However, in practice, via data electrode 31 all data pulses and all setting signals are supplied for all pixels 11 in the same column subsequently. This would make the FIG. 4 much more complicated, and therefore, for the sake of clarity, only for one pixel 11, the voltages according to the invention have been shown. Independent of the complexity shown, the principle of course remains the same.

The pixel voltage is the difference between V5 and V6. As can be derived from FIG. 4, frame periods with a pixel voltage of +30 Volt and −30 Volt are separated by equal frame periods with a pixel voltage of 0 Volt. A voltage of 0 Volt does not cause the optical state of the pixel to change. Preferably therefore, the setting frame period $F_s$ is shorter than the driving frame period $F_d$, to minimise the reduction of the driving speed resulting from the introduction of the setting frame $F_s$. Compared to the considerable reduction of the total image update time resulting from the increased voltage amplitudes across the pixel 11, the increase of the image update time resulting from the introduction of the setting frame $F_s$ can be neglected.

In a further preferred embodiment, the alternating voltage signal V6 has a period equal to the sum of a single setting frame period and more than one driving frame period. In this manner, if only voltages of a single polarity are required for a period of several frames, it is not required to introduce a setting frame until the polarity of the high voltage pulse must be changed. In this way, the increase of the image update time caused by the setting frame period Fs can be further minimised.

The use of higher voltages allows some advantageous options. According to a first advantageous option, a high voltage reset signal can be generated. As the (over) reset is one of the longest parts of a rail stabilised drive scheme, it is especially advantageous to reduce the time of the reset. With a common counter electrode however, it will be possible to provide either a high positive or a high negative voltage to the entire display. This makes it feasible to reset the entire display to either one of the extreme optical states (say fully black or fully white), from where the new image will be written onto the display. In this case, in order to minimise the build up of excessive DC voltages, the reset may be chosen to be to alternating black/white/black/white states at each subsequent image update, whereby the long term build up of DC voltages can be limited.

According to a second advantageous option, a high voltage shaking signal can be generated. Shaking is a key component of all drive schemes, so it is always advantageous to reduce the time of the shaking pulses. With a common counter electrode however, it will be possible to provide either a high positive or a high negative voltage to the entire display. This makes it feasible to shake the entire display alternatively to the extreme optical states (say fully black or fully white), from where the remainder of the drive waveform will be applied. According to this approach the shaking may be rather visible as a flickering screen. This will be particularly apparent, as the higher voltage will make the flicker more visible. In a preferred embodiment therefore the high voltage driving method will be used in combination with a higher than normal frequency of shaking (for example in excess of 50 Hz).

In particular, the invention can be advantageously applied to systems driven with variable amplitude voltages.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "to comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. An electrophoretic display unit (1) comprising an electrophoretic display panel (50) comprising a plurality of pixels (11) each coupled to a pixel electrode (5), the plurality of pixels being arranged in a plurality of rows and columns;

data driving circuitry (30) for supplying a data pulse ($D_1$, $D_2$, $D_3$, $D_4$, $D_5$, $D_6$) to each of the pixel electrodes (5) via a switching element associated with each pixel electrode;

a common electrode (6) coupled to the plurality of pixels (11) for receiving an alternating voltage signal ($V_6$); and a controller (20) for controlling the data driving circuitry (30) for supplying a setting signal ($S_1$, $S_2$) to each of the pixel electrodes (5) for reducing a voltage across the associated pixel (11) before a transition of the alternating voltage signal ($V_6$), wherein the data pulse ($D_1$, $D_2$, $D_3$, $D_4$, $D_5$, $D_6$) is supplied during a driving frame period ($F_d$) during which each row of pixels (11) is selected in turn; and the setting signal ($S_1$, $S_2$) is supplied during a setting frame period ($F_s$), the alternating voltage signal ($V_6$) being reversed in polarity after each setting frame period ($F_s$).

2. An electrophoretic display unit (1) as defined in claim 1, wherein the switching element comprises a transistor (12), having a gate, source and drain, the data driving circuitry (30) being coupled to the source via a data electrode (32) the selection driving circuitry (40) being coupled to the gate via a selection electrode (42), and the pixel electrode (5) being coupled to the drain.

3. An electrophoretic display unit (1) as defined in claim 1, wherein the data pulse ($D_1$, $D_2$, $D_3$, $D_4$, $D_5$, $D_6$) is supplied during more than one consecutive driving frame period ($F_d$).

4. An electrophoretic display unit (1) as defined in claim 1, wherein the setting frame period ($F_s$) is shorter than the driving frame period ($F_d$).

5. An electrophoretic display unit (1) as defined in claim 1, wherein the alternating voltage signal ($V_6$) and the setting signal ($S_1$, $S_2$) have equal polarities during the setting frame period ($F_s$).

6. An electrophoretic display unit (1) as defined in claim 1, wherein the amplitude of the alternating voltage signal ($V_6$) and the amplitude of the setting signal ($S_1$, $S_2$) are substantially equal to each other during the setting frame period (Fs).

7. An electrophoretic display unit (1) as defined in claim 1, wherein the controller (20) is adapted to control the data driving circuitry (30) to provide any one or more of:

shaking data pulses;

one or more reset data pulses; and one or more driving data pulses;

to each pixel (11).

8. A display device comprising an electrophoretic display unit (1) as defined in claim 1; and a storage medium for storing information to be displayed.

9. A method of driving an electrophoretic display unit (1) comprising an electrophoretic display panel (50), which comprises a plurality of pixels (11) each coupled to a pixel electrode (5), the plurality of pixels being arranged in a plurality of rows and columns, which method comprises the steps of during a driving frame period ($F_d$) during which each row of pixels (11) is selected in turn, supplying a data pulse ($D_1$, $D_2$, $D_3$, $D_4$, $D_5$, $D_6$) to each of the pixel electrodes (5);

supplying an alternating voltage signal ($V_6$) to a common electrode (6) coupled to the plurality of pixels (11) and controlling data driving circuitry (30) for supplying, during a setting frame period ($F_s$), a setting signal ($S_1$, $S_2$) to each of the pixel electrodes (5) for reducing a voltage across the associated pixel (11) before a reversal of polarity of the alternating voltage signal ($V_6$) occurring after each setting frame period ($F_s$).

* * * * *